(12) United States Patent
Florek et al.

(10) Patent No.: US 7,989,028 B2
(45) Date of Patent: Aug. 2, 2011

(54) CONTINUOUSLY MANUFACTURED COLORED METALLIC PRODUCTS AND METHOD OF MANUFACTURE OF SUCH PRODUCTS

(75) Inventors: James Florek, New Lenox, IL (US);
James Hays, Orland Park, IL (US);
William Boyce, Villa Park, IL (US)

(73) Assignee: Allied Tube & Conduit Corporation, Harvey, IL (US)

( * ) Notice: Subject to any disclaimer, the term of this patent is extended or adjusted under 35 U.S.C. 154(b) by 785 days.

(21) Appl. No.: 10/702,625

(22) Filed: Nov. 6, 2003

(65) Prior Publication Data

US 2005/0249965 A1      Nov. 10, 2005

Related U.S. Application Data

(60) Provisional application No. 60/455,933, filed on Mar. 19, 2003.

(51) Int. Cl.
*B05D 3/02* (2006.01)

(52) U.S. Cl. ........................................ 427/321

(58) Field of Classification Search ................... 427/321
See application file for complete search history.

(56) References Cited

U.S. PATENT DOCUMENTS

| | | | |
|---|---|---|---|
| 2,393,665 A * | 1/1946 | Taylor | 148/265 |
| 3,559,280 A * | 2/1971 | Mailhiot et al. | 29/527.4 |
| 3,956,051 A | 5/1976 | Carter | |
| 3,965,551 A * | 6/1976 | Ostrowski | 29/33 D |
| 3,967,984 A * | 7/1976 | Helwig et al. | 148/258 |
| RE29,112 E | 1/1977 | Carter | |
| 4,073,978 A * | 2/1978 | Womack et al. | 427/235 |
| 4,288,519 A * | 9/1981 | Diamond et al. | 430/137.18 |
| 4,304,822 A * | 12/1981 | Heyl | 428/623 |
| 4,441,238 A | 4/1984 | Hijuelos | |
| 4,578,122 A | 3/1986 | Crotty | |
| 4,889,602 A * | 12/1989 | Oshima et al. | 205/176 |
| 5,316,606 A | 5/1994 | Andre | |
| 5,356,679 A | 10/1994 | Houis | |
| 5,364,661 A * | 11/1994 | Maitra et al. | 427/433 |
| 5,449,579 A * | 9/1995 | Tarutani et al. | 430/31 |
| 5,651,819 A * | 7/1997 | Krengel et al. | 118/63 |
| 5,723,183 A * | 3/1998 | Williams et al. | 427/409 |
| 5,867,883 A | 2/1999 | Iorio | |
| 6,009,912 A | 1/2000 | Andre | |
| 6,245,183 B1 * | 6/2001 | Iorio et al. | 156/244.14 |

FOREIGN PATENT DOCUMENTS

JP          63-212013          5/1988

* cited by examiner

*Primary Examiner* — Michael Cleveland
*Assistant Examiner* — Robert Vetere
(74) *Attorney, Agent, or Firm* — Kacvinsky Daisak PLLC

(57) ABSTRACT

Metallic tube, pipe and conduit are made in a continuous process that includes a zinc galvanization stage, a first passivation stage, a second passivation stage and a third passivation stage. A colorant is added to the tube, pipe or conduit during the continuous manufacturing process, and the colorant imparts the appearance of a color, such as red. The continuous movement of the tube, pipe or conduit is not halted during normal operation of the tube, pipe or conduit manufacturing and coloring process.

5 Claims, 2 Drawing Sheets

CONTINUOUSLY MANUFACTURED COLORED METALLIC PRODUCTS AND METHOD OF MANUFACTURE OF SUCH PRODUCTS

CROSS REFERENCE TO RELATED APPLICATION

This application claims priority to U.S. Provisional Application Ser. No. 60/455,933, filed Mar. 19, 2003, which is incorporated herein by reference in its entirety.

FIELD OF INVENTION

The present invention relates to shaped metallic products such as steel pipe, tube or conduit made in a continuous manufacturing process that incorporates coloration as a part of the continuous process and relates to the method of manufacture of such metallic products.

BACKGROUND OF THE INVENTION

The present invention concerns shaped metallic products such as steel pipe, tube or conduit made in a continuous manufacturing process that, along with forming the metallic shaped product, adds color to the outer surface of the product. Metallic products such as tubes, pipes and conduit containing the appearance of color are extremely useful. Colored tubes may be used to designate the purpose of the tube. For example, red-colored tube can be used to contain the electrical wires for fire detection and response systems; blue-colored tube can be used to contain drinking water or coolant; yellow-colored tube can be used to contain and transport hot water. The addition of color to tube assists in installation and inspection of the tube and aids in easy identification of tube that is used for a particular purpose.

Previously, manufacture of colored tube generally involved a non-continuous process. In previous processes, metal strip was formed into tube in one process and then removed from the forming process. Color was then added to the tube in a different process. The coloration process occurred at a separate location and a separate time from the tube manufacturing process. The process for making the tube and the process for adding coloration, in the previous processes, were not part of the same continuous process. The use of separate processes for making and adding color to tube has the drawbacks of decreasing the efficiency and increasing the cost of the process of creating colored tube, and preventing the colorant from being added to the tube as part of the tube manufacturing process In the current invention, the addition of color to the tube, pipe or conduit occurs in the same continuous process as that in which the tube, pipe or conduit is formed. The coloration process is part of the continuous manufacturing process. The tube, pipe or conduit does not cease moving and is not cut until after the coloration process in the current invention. It is understood that while the word "tube" is frequently used in this description, the description applies equally to pipe, conduit and other metallic cylinders and columns as well as tube. In addition, while the specific examples mentioned in the preferred embodiments frequently refer to tube, the present invention includes pipe, conduit, columns, cylinders, squares, rectangles, solids and non-solid shapes (such as bars, beams, strips or other non-solid shapes) as well as tube.

The current invention has many benefits, including increased efficiency, decreased need for space for equipment, decreased labor and decreased difficulties involved in transferring formed and cut tube to a coloration station. The current invention provides for clearly visible tube systems, eases and saves time with installation and inspection, and assists with future upgrades and maintenance of tube systems. The current invention decreases the labor and material costs associated with painting and creates greater system integrity.

BRIEF SUMMARY OF THE INVENTION

The present invention concerns shaped metallic products such as steel tube made in a continuous process in which the addition of color to the tube is a part of the continuous manufacturing process, and concerns the process for making such tube.

Figure 1:
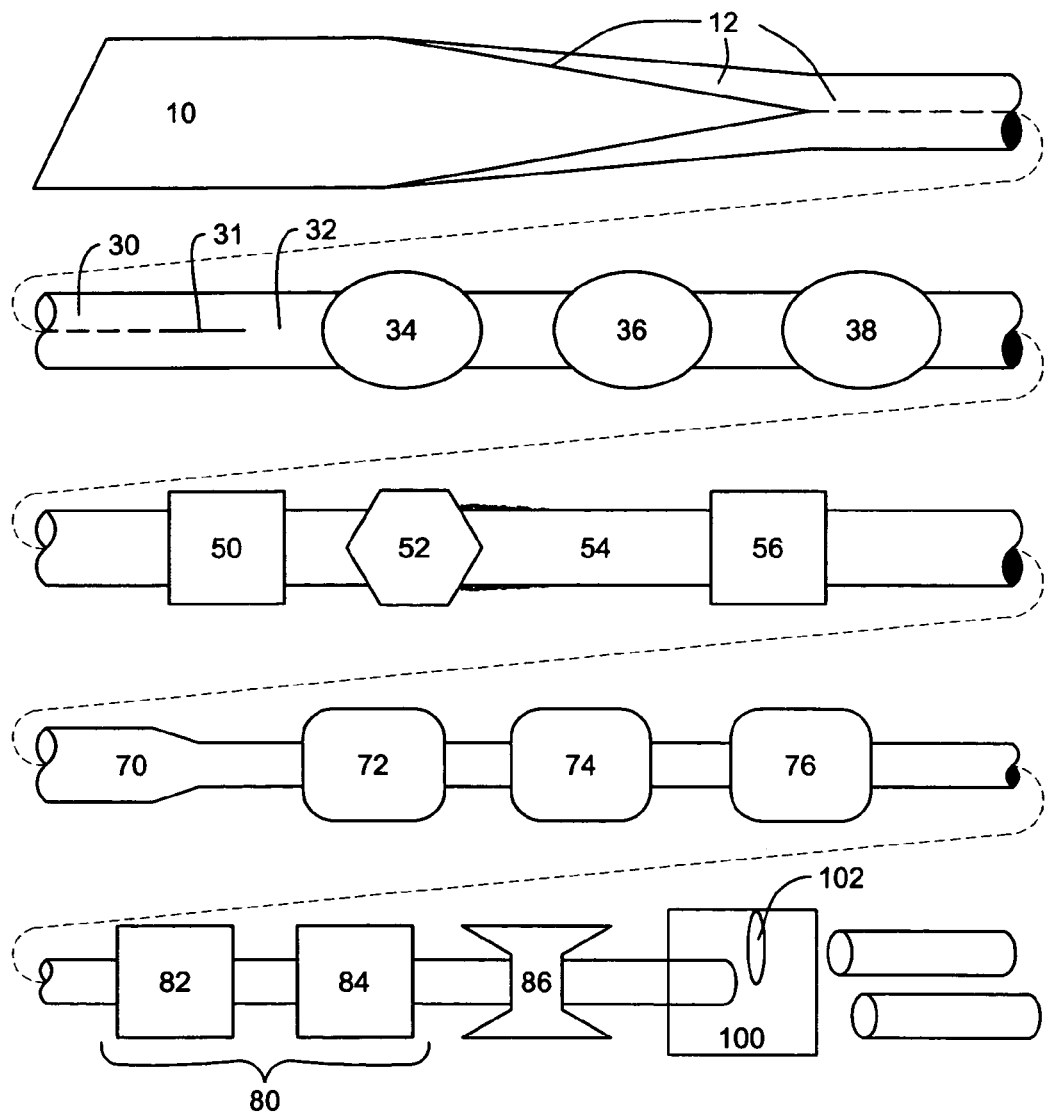
FIG. 1 is a block diagram of one embodiment of the manufacturing process for a metallic tube of the present invention.

Before the embodiments of the invention are explained in detail, it is to be understood that the invention is not limited in its application to the details of the method, or arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

The following paragraphs describe a few of the embodiments of the current invention. In one embodiment, coiled steel is first obtained from an external or internal source. The coiled steel typically is flat, cold rolled or hot rolled carbon steel. If the steel is hot rolled, typically it also is pickled to remove the scale, and then oiled and recoiled. The coiled steel typically comes from one of numerous industry sources as flat rolls of steel weighing in excess of 1,000 lbs. The rolls typically are more than three feet wide upon receipt and contain flat rolls of steel of approximately 2,000-3,500 feet in length.

The coiled steel is slit to obtain an appropriate width strip for the outer diameter or shape of the final product that will be manufactured. After being slit, the coiled steel is drawn off the roll and may be placed into an accumulating station. The accumulating station connects the ends of flat strips of steel from different coils into a continuous flat strip.

The steel is then subject to a cleaning process to remove oil and other contaminants. In the cleaning process, the steel is typically subjected to a series of alkaline cleaners, high-pressure water and a squeegee blow-off stage.

As shown in FIG. 1, in one embodiment of the invention, after being cleaned the steel [10] begins a continuous manufacturing process. In the first stage [12] of the continuous process, the steel is formed. In this stage, the steel is rolled or molded from its flat shape and into the desired shape. Common desired shapes include tubes, squares, rectangles and non-solid shapes.

After the steel is formed to the desired shape, it is subjected to a welding process [30], which forms the steel into a continuous surface. If the desired shape is a non-solid, the welding process is not used. The welding process typically creates a seam or weld [31] where the steel has been connected to itself. Welding may be done by any common method, such as natural resistance, electrical resistance and high frequency welding.

In some embodiments, before the steel reaches the welding point, a paint lance may be inserted into the interior of the steel. If the steel has been formed into a tube, the paint lance is inserted inside the tube. The paint lance has a paint head that is down-stream from the insertion point of the lance. By the time the steel has progressed to the point where the paint head is located, it has cooled sufficiently to allow paint to be applied to the inner surface of the tube. The paint lance then sprays paint, a coating, such as an antibacterial coating, a corrosion-resistance material or some other covering onto the interior of the steel.

In some embodiments, after being welded, the outer surface of the steel is smoothed [32]. Again, if the desired shape is a non-solid and no welding process is used, there is no need to employ a smoothing process and therefore this smoothing stage is avoided. Frequently, a roughened or bumpy surface exists at the site of the weld after the welding process. The smoothing process, which may involve wire brushing, removes the rough or bumpy areas.

In some embodiments, after being smoothed, the steel is again cleaned [34] with a typical cleaner, such as an alkaline cleaner. The steel is then subjected to an acid bath [36], which contains an acidic substance such as hydrochloric acid, which removes oxide from the steel surface. The steel is then rinsed [38] with a rinsing agent such as water and subjected to pre-heating [50]. In the pre-heating stage, the temperature of the steel is raised to the point that it may be subjected to rapid galvanization.

After pre-heating, the steel is galvanized [52]. In some embodiments, the galvanization can be accomplished by any method that is standard for the industry. One of these methods involves passing the steel through a zinc pot. The zinc pot contains high levels of molten zinc. When the steel passes through the molten zinc, some of the zinc may react with and adhere to the steel. The method by which such galvanization takes place is well-understood in the industry.

After galvanization, the steel is subjected to a blow-off stage [54], which removes excess zinc through blown air, vibration or contact removal. The steel then passes through a liquid quenching stage [56] in some embodiments, which lowers the temperature of the steel and sets the zinc into the steel. Common quenching methods include passing the tube through a bath of temperate water. After being quenched, the steel is sized [70]. In this stage the steel is subjected to sizers, such as rollers and molders, which form the steel into the exact desired outer diameter or shape.

Different outer diameters and shapes are used for different applications. Tube with an outer diameter of a maximum of 1.740, 1.510, 1.163, 0.922 or 0.706 inches is useful for applications that benefit from tube with a smaller diameter, such as carrying small amounts of electrical wire, water or compressed air. Tube with an outer diameter of a minimum of 2.197, 2.875, 3.5, 4.0 or 4.5 inches is useful for applications that benefit from tube with a larger diameter, such as carrying larger amounts of electrical wire, water or compressed air. Different gauges of tube are involved in the present invention. In one embodiment, the final manufactured tube has a gauge approximately between 8 and 18.

In the embodiment of the invention shown in FIG. 1, the steel is then subjected to passivation. In the passivation stage [72], a barrier is bonded (through physical and/or chemical bonding) on the outer zinc surface. Passivation can be accomplished through a reactive process, a non-reactive process or a combination of reactive and non-reactive processing. The passivation barrier may decrease interactions between outside moisture or air and the zinc layer or the underlying steel and may form a coating. The barrier may limit white rust or other contamination occurring on the surface of the zinc. The barrier also can provide corrosion resistance. One method of passivating the zinc is to pass the zinc-coated steel through a bath that includes hexavalent chromium. Other passivation methods, including the use of non-chromium coatings, also can be used.

In the embodiment shown in FIG. 1, after the first passivation stage, the steel may be subjected to a second passivation stage [74]. In the second passivation stage, a second barrier is placed over and bonded (through physical and/or chemical bonding) to the first barrier. The second passivation stage can employ reactive processes, non-reactive processes or a combination of reactive and non-reactive processes. The second passivation barrier may form a coating and may assist with corrosion resistance and inhibit air and moisture from interacting with the first barrier, the zinc layer and/or the steel.

In the embodiment shown in FIG. 1, after the second passivation stage, the steel may be subjected to a third passivation stage [76]. In the third passivation stage, a third barrier is placed over and bonded (through physical and/or chemical bonding) to the second barrier. The passivating substance used in the third passivation stage may mix or intermingle with the passivating substance in the second passivation stage prior to either substance fully setting or drying. The resulting bonds that are formed create increased interconnectivity between the second and third passivation stage. In other embodiments (e.g., where the distance between the second passivation stage and the third passivation stage is large or where the second passivation substance(s) dries quickly), the third passivation substance does not mix or intermingle with the substance over which it is applied.

The third passivation stage can employ reactive processes, non-reactive processes or a combination of reactive and non-reactive processes. The third passivation barrier may form a coating and may assist with corrosion resistance and may inhibit air and moisture from interacting with the second barrier, the first barrier, the zinc layer and/or the steel. Additional passivation stages beyond the third passivation stage, placing additional barriers over the metallic substrate, also may be used.

In one embodiment, the method used for the passivation stage(s) involves passing the tube through a bath of the passivating substance. Another embodiment involves a flood and wipe method that involves passing the steel tube through a bath that includes a lacquer or other passivating substance, and excess passivating substance is then wiped from the tube as it nears the end of the passivation stage. In another embodiment, the method used in the passivation stage(s) involves a vacuum coating method that involves passing the steel through a vacuum chamber and spraying the passivating substance, such as a lacquer, on the steel. Excess substance is then vacuumed off the exterior of the tube. Additional embodiments of the present invention involve application of passivation substances through other methods, such as conventional spray, electrostatic spray, fluidized bed, and a combination of two or more of these methods.

The passivation substances and passivation barriers may form complete barriers or may form only partial barriers. In some embodiments, the passivation substances are applied as uniform coatings that fully coat the underlying layer or tube. In other embodiments, the passivation substances are applied as patterns and only partially coat the underlying layer or tube. In these later embodiments, the partial coating of the passivation substance does not provide a uniform barrier between the outside air and the underlying layers and tube, and the ability of the substance to assist with corrosion resistance and inhibit air and moisture from interacting with the underlying layers and steel may be further limited or eliminated altogether.

In one embodiment, the method used for application of the passivation substance(s), especially in the third passivation stage, involves spraying and curing or drying. The steel tube passes through a spray station in which several nozzles spray the passivation substance(s), in a liquid form, onto the exterior of the pipe and underlying coatings. The nozzles are easily adjustable. The size of the particle that leaves the nozzle can be adjusted by adjusting the size of the nozzle orifice through which the passivation substance passes. The volume of the flow of material through the nozzle also can be adjusted. In some embodiments, a nozzle orifice size of between approximately 0.01 and 0.02 inches is preferred and a nozzle orifice of approximately 0.015 inches more preferred. A decrease in the size of the particle that is sprayed on the tube makes the coating on the tube more even. Through this spraying method, a uniform amount of the passivation substance(s) is applied to the exterior.

In another embodiment, the method used for application of the passivation substance(s) especially in the third passivation stage, involves a vacuum coating method. In this method, the steel tube passes through a vacuum chamber. The passivating substance is sprayed onto the steel while it is in the chamber. Excess substance is then vacuumed off the exterior of the tube. Through the method of vacuum coating, a substantially uniform amount of passivation substance is applied to the exterior of the tube.

Numerous other passivation methods are common in the industry for the passivation stage(s). Each of the passivation methods described herein can be used for the first, second, third, or subsequent passivation stages.

Substances involved in the passivation process include urethanes, acrylic compounds or epoxies, which are often contained in lacquers or powders, all of which are commonly available in the market. These passivation substances may be solids, water based or solvent based, and may be cured in standard manners, including ultra violet light, induction, infrared, conventional, air and electron beam curing. These passivation substances also may contain polymer resins, organics, chromium or solvents. Where the passivation substances contain organics, the coatings they form may be referred to as organic coatings. These passivation substances can contain materials such as chromium, sec butyl alcohol, propylene glycol, propylene glycol n-propyl ether, 2-butoxy ethanol, triethylamine and other materials. The passivation substances form a bond, physical or chemical, with the layer beneath them, and may or may not be involved in chemical reactions with the underlying layer(s), the underlying zinc or the underlying metal. In some embodiments the passivation substances may contain no less than 60% water. In some embodiments the passivation substances may contain no more than 20% solids. The level of solids and/or level of water in the passivation substances can assist the ease of the application of the passivation substances and can promote uniform coating.

In one embodiment, the passivation substance used in one or more stages includes a colorant. This colorant may be any substance that imparts the appearance of a color, shade, value or hue to the outer surface of the metal, such as a pigment, powder, liquid, ink or identifying lacquer. Numerous colors can be used with the colorant, including red, green, yellow, blue, orange, purple, brown, white, black and other colors. This colorant remains with the tube or other shape after the continuous manufacturing process is completed.

Care must, be taken when using a flood and wipe method to apply colorant. This method can cause streaking of the color and make the pipe visually unappealing if not closely monitored. In the flood and wipe method, the wipe cloth may need to be changed frequently (every 10 minutes) to avoid streaking. Applying colorant as part of a spraying process, as described above, assists in eliminating such streaking. Applying colorant in the spraying process also applies a thinner color than is applied in the vacuum coating process. This thinner color is more easily applied in a manner that keeps the color somewhat transparent.

The passivation stages and passivation substances previously described each are optional. In one embodiment of the present invention, three or more passivation stages are used. In another embodiment, only one passivation stage is used. In another embodiment, there is no passivation stage.

The present invention also encompasses colorant being applied to the tube or other shape at one or more of several different phases in the continuous manufacturing process. In one embodiment, colorant is added in the third passivation stage. If an earlier passivation substance includes chromium, the colorant added to the third passivation stage may need to be compatible with chromium. In other embodiments, the colorant is added in the first or second passivation stage. In another embodiment, the colorant is added in the sole passivation stage. In another embodiment, the colorant is added as part of the galvanization stage. Colorant added in the galvanization stage must maintain its integrity at the temperature of the galvanization stage. In other embodiments, color is added before the first passivation stage, after the last passivation stage, or in several passivation and/or non-passivation stages.

One method of adding a colorant to the metal during the galvanization stage involves including a colorant in the quench material that is applied to the tube after it leaves the galvanization stage. Such colorants are readily available and include pigments, powders, liquids, inks or identifying lacquers. The quench material used may be water or some other solvent (organic or inorganic), and the colorant is combined with this material prior to the quenching of the steel. The quench material, including the colorant, forms a bond with the galvanized tube and imparts the appearance of color to the tube.

In another embodiment of the present invention, colorant is added before the first passivation stage or after the final passivation stage. Prior to the first passivation stage or after the final passivation stage, an additional substance, such as a coating, paint, resin, powder or lacquer, is applied to all or a portion of the tube. This substance contains a colorant, which imparts the appearance of color to the tube. This substance can be applied to the tube through numerous well-known processes such as spray (e.g., electrostatic spray or conventional spray), fluidized bed, powder or vacuum coating. The colorant may be applied to the entire tube, or may be applied to a portion of the tube in a pattern, such as a stripe, spiral, text, dots or other pattern.

After leaving the third passivation stage, in some embodiments, the tube enters a drying stage [80]. In the drying stage the final passivation substance is cured and/or dried to the point that the tube can be touched by a bounce limiter or other device after leaving the drying stage without rubbing off a portion of the passivation substance.

In some embodiments the drying stage can take the form of an induction box [82] followed by a drying tunnel [84]. The induction box [82] may consist of a pipe of non-magnetic material that is approximately 3-7 feet long and wider than the tube being manufactured. A coil is wrapped around the pipe and a current is passed through the coil creating a magnetic field and a heating area for objects that pass within the pipe. The tube then passes through the pipe and is heated. An air source also is connected to the pipe to pass air through the heating area. In some embodiments the air moves at a rate of approximately 1500-2500 cfm. The air is generally approximately 20-50 degrees Fahrenheit warmer than ambient air. Tube moving at a rate of 600 ft./min. passes through an induction box with a length of approximately 3-7 feet in approximately 0.3-0.7 seconds.

In some embodiments the induction box is followed by a dry tunnel [84]. The dry tunnel [84] is a pipe that that is wider than the tube being manufactured and is approximately 6-10 feet long. An air source is connected to this pipe, which passes air through the pipe at a rate of approximately 1500-2500 cfm. The air is generally approximately 20-50 degrees Fahrenheit warmer than ambient air. The tube being manufactured passes inside this pipe and is contacted by the blowing air. Tube moving at a rate of 600 ft./min. passes through a dry tunnel with a length of approximately 6-10 feet in approximately 0.6-1 second. In some embodiments, when the tube leaves the dry tunnel, the third passivation substance has dried to the point that the tube can be touched without marring the surface. In these embodiments, the third passivation substance dries or cures within approximately between 0.9 and 1.7 seconds after it is applied to the tube.

In some embodiments, the steel may be subject to additional heating, cooling and/or drying. In some embodiments, bounce limiters [86] are installed after the drying stage(s). At the end of the manufacturing process, the steel is cut to the desired length with a blade or other cutting device [102]. The blade may include a sharp device that swings through the tube at desired intervals. The cutting process may cause the steel to bounce somewhat. The cutting blade may cause the steel to slow its forwarded advancement slightly when the steel is cut. When the forward advancement is slowed, the steel bounces in a vertical direction to maintain its continuous advancement. This bouncing can have deleterious effects on the outer surfaces of the steel and can negatively impact the continuous manufacturing process. To limit this bouncing, bounce limiters [86] are installed in the continuous manufacturing process to be available to contact the steel after it has been dried and before the cutting stage.

Bounce limiters in some embodiments diminish the amplitude of bouncing of the tube caused by cutting and limit the propagation of large bounce amplitudes backward along the continuous manufacturing process. In some embodiments bounce limiters can include bounce rolls that are made of polyethylene, polypropylene, other plastic, metal or other formative substance. Bounce limiters can incorporate springs or other shock mechanisms that will assist in at least partially absorbing and dissipating the bounce of the tube. These springs or shock mechanisms are optional and the bounce limiters can function without them in some embodiments. The bounce limiters may be connected to a stationary material that does not move in a vertical direction.

Bounce limiters can be placed underneath the tube to limit the tube from traveling downward from its manufacturing path. Bounce limiters also can be placed above the tube to limit the tube from altering its manufacturing path and moving upward. In one embodiment, bounce limiters have no spring mechanism and take the form of a pair of cylindrical rolls that roll with the tube when the tube is in contact with them and prevent the tube from moving in a downward direction. Bounce limiter pairs may be horizontally staggered so that one bounce limiter is further downstream in the manufacturing process than the other bounce limiter of the pair. Due to the dryness of the tube after the drying stage(s) the bounce limiters have very limited effect on the appearance or functionality of the outer coating on the tube.

After passing through the bounce limiters, the steel is cut in the cutting stage [100] that includes a blade or other cutting device [102]. The blade may be a metal object that swings through the tube very quickly. The blade also may be incorporated into a mechanism that briefly attaches to the tube prior to cutting, travels with the tube during cutting and then detaches from the tube. The blade may include a sharp device that swings through the tube at desired intervals.

The present invention imparts color to galvanized tube in some embodiments. Due to its galvanized nature, the tube may be rippled with markings referred to in the industry as galvanization ripples, air rings or water quench rings. The present invention imparts color to the tube regardless of this rippling. The present invention also imparts color to the tube regardless of whether the tube has been buffed or polished or otherwise smoothed.

During the continuous manufacturing process, in one embodiment, the steel moves at a substantially constant rate of speed. This rate is preferably more than one hundred feet per minute, more preferably more than three hundred feet per minute, even more preferably more than six hundred feet per minute, and most preferably more than one thousand feet per minute. The steel moves from the forming stage through the final passivating stage and to the cutting stage in a continuous process. The steel is not stopped at any normal operating time, but continuously moves through each stage of the entire process.

An additional embodiment of the present invention involves the use of pre-galvanized steel in the continuous manufacturing process. In this embodiment, rather than beginning the process with cold or hot rolled steel that has been cut and cleaned, but not galvanized, the process begins with steel that already has been subject to galvanization. In this embodiment, the steel is pre-galvanized before it begins the continuous manufacturing process.

In one embodiment of the present invention, a flat strip of pre-galvanized steel is subjected to the continuous forming process and the welding process as described above. After being welded, the tube or other solid shape of pre-galvanized steel will have an area at the weld in which the galvanization has been removed. The zinc galvanization is replaced on this area through numerous methods well known in the art, such as by arc flash or vaporization of zinc wire at the site of the weld. Through this process, additional zinc is placed or sprayed onto the weld area, thereby replacing the zinc that was removed during the welding process. If the desired end shape is a non-solid, the welding and zinc galvanization replacement stages are not used.

After the galvanization replacement stage, this tube or other shape may go through one or more of the stages described above, including the passivation stages. A colorant also may be added to this tube or other shape through the methods described above.

In another embodiment of the present invention, the steel is never galvanized. The galvanization stage described above may be replaced with a galvalum or galvanizing stage. Galvalum and galvanizing processes are well known in the art. The galvanization stage also may be replaced with a process that hardens and strengthens the metal and lowers its ductility.

Figure 2:
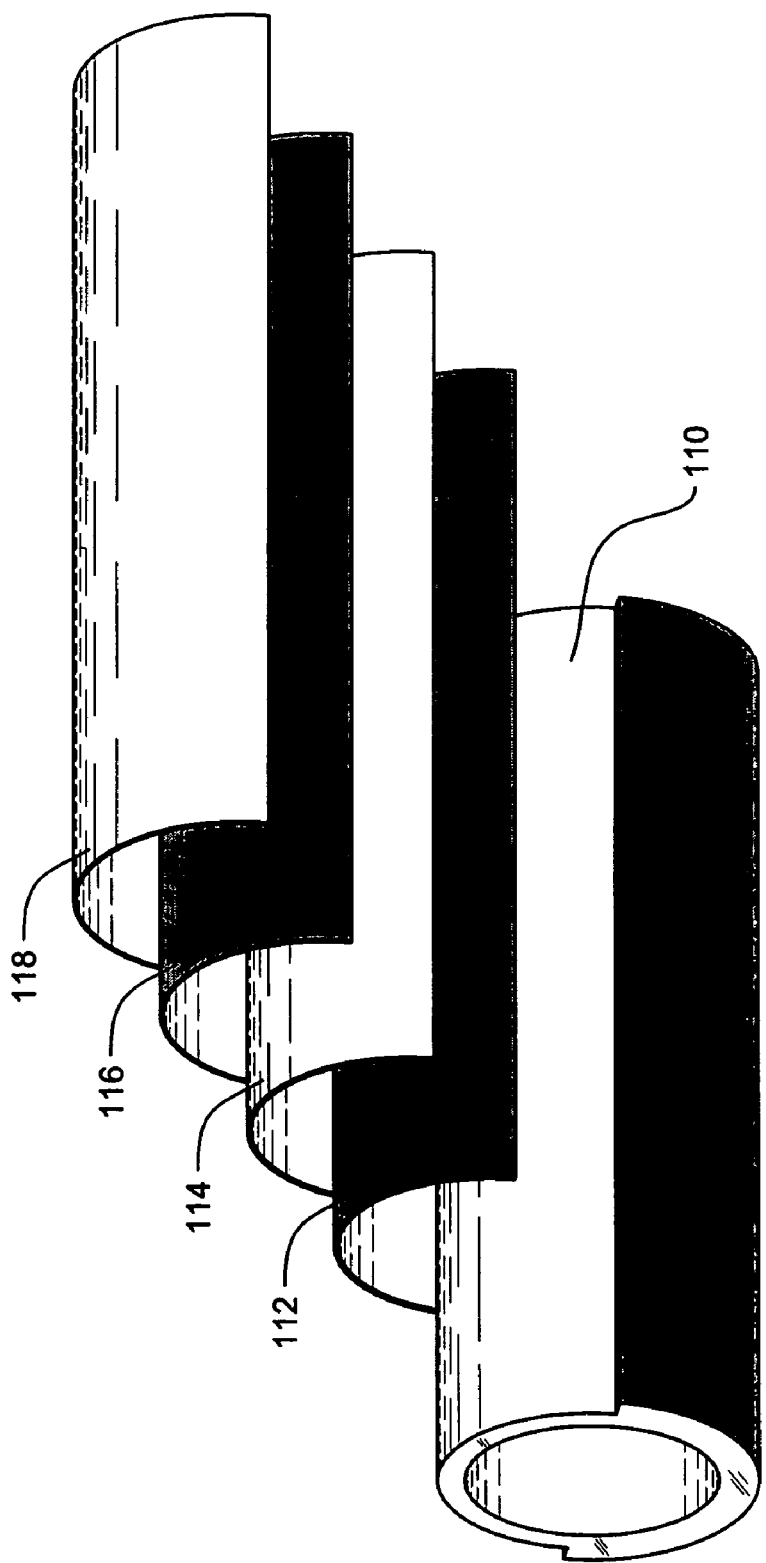
FIG. 2 is a depiction of one embodiment of a finished metallic tube of the present invention, showing layers of the finished tube cut away.

FIG. 2 shows one embodiment of the present invention with layers of steel tube cut away. The first and innermost layer is the steel itself [110]. The next layer is a zinc galvanization layer [112]. The next layer is a first passivation layer [114]. A second passivation layer [116] also may be included over the first passivation layer. A third passivation layer [118] also may be included over the second passivation layer. The first, second and third passivation layers may contain any or all of the passivation substances described above and/or chromium.

The processes described above may be used to create different types of tube, including Electrical Metallic Tubing, Intermediate Metal Conduit and tube that meets the specifications set forth by standardization organizations, such as the Underwriters Laboratories, Inc. and American National Standards Institute, including UL 797, UL 1242, ANSI C80.3 and ANSI C80.6, each of which is enclosed and incorporated by reference in this application. In a preferred embodiment, the process described above is used to make Electrical Metallic Tubing.

In one embodiment, tube made from the process described above may be used to enclose and protect electrical wire. Such electrical wire is placed within the tube subsequent to manufacture of the tube and installed with a corresponding electrical system. This tube also can be used to house other substances such as liquids, water for sprinkler systems or gases.

After the tube has been manufactured, it may be installed. Different colors of the tube can be installed for different applications. In one embodiment, to install this tube, colored tube made from the continuous process described herein is placed in or near a building. Electrical wires that are part of or related to the building's fire alarm detection and/or response systems are then placed within the tube. These wires may be connected to the building's central computing system or systems. One method of placing the wires in the tube is to blow a lead string through the tube. This string is attached to the wires and by pulling the string from one end of the tube, the wires are pulled through the tube. Other methods of placing the wires in the tube are well understood in the industry.

The electrical wires within the colored tube are easily locatable in this embodiment. For fire alarm detection or response systems, tube with a red color can be used. By locating the red-colored tubes, one has located the electrical wires for the fire alarm detection and response system.

This same installation method can be used for other applications with tube containing different colors. Tube made using the process described herein and containing another color, such as green or yellow, may be installed in or near a building. Electrical wire for other applications, such as computing applications, security, lighting, motion tracking, ventilation, air conditioning, and heating is then placed within the tube and may be connected to the building's central computing or data collection system.

In this manner, the wire for these applications can be easily located in times of need by locating tube with the appropriate color. Additional systems, such as sprinkler systems or gas systems containing gases such as oxygen or compressed air, can be incorporated into tube made according to the invention described herein and containing a different color, such as blue, orange, or other color, and that has been installed in or near a building.

A particular building may contain two or more separately colored tubes. Each separately colored tube contains wires or other substances for distinct applications. For example, a particular building may contain red tube for fire detection and treatment wires and substances, green tube for computing wires, yellow tube for electrical wires related to lighting, blue tube for a water or a sprinkler system, and orange tube for motion tracking devices. The wires or other substances in one or more of the tubes may be connected to the building's central computing system or systems. This central system may consist of one or more computers or computing devices. This central system may be used to collect the information provided by and coordinate the activity of the substances in each separately colored tube.

While the invention has been described with respect to specific examples and embodiments including presently preferred modes of carrying out the invention, those skilled in the art will appreciate that there are numerous variations and permutations of the above described substances and methods that fall within the spirit and scope of the invention.

What is claimed is:

1. A method for imparting a colorant to a metallic surface during a continuous manufacturing process, comprising:
   in a continuous manufacturing process providing movement of a metallic tube there through, said continuous manufacturing process comprising the steps of:
   galvanizing a surface of said metallic tube;
   applying first, second and third passivation layers to the galvanized surface; and
   providing a colorant on or within at least one of the first, second and third passivation layers;
   wherein the colorant is applied in a quench material applied to the tube after galvanizing.

2. The method of claim 1, wherein the third passivation layer is applied over the second passivation layer before the second and third passivation layers set or fully dry so that said second and third passivation layers intermingle to provide increased interconnectivity there between.

3. The method of claim 1, wherein at least one of the first, second and third passivation layers contains said colorant, and said passivation layer containing said colorant is applied as a pattern.

4. The method of claim 3, wherein said patterned passivation layer provides a patterned color appearance to the metallic tube.

5. The method of claim 1, wherein the colorant is provided on or within the third passivation layer.

* * * * *